TRANSISTOR VERTICAL DEFLECTION CIRCUITS

Filed March 23, 1962

INVENTOR.
LARRY A. FREEDMAN
BY
W. H. Spouagle
ATTORNEY

INVENTOR.
LARRY A. FREEDMAN
BY
W. H. Sprague
ATTORNEY

United States Patent Office 3,134,928
Patented May 26, 1964

3,134,928
TRANSISTOR VERTICAL DEFLECTION CIRCUITS
Larry A. Freedman, East Brunswick, N.J., assignor to Radio Corporation of America, a corporation of Delaware
Filed Mar. 23, 1962, Ser. No. 181,909
4 Claims. (Cl. 315—27)

This invention relates to television receiver circuits, and more particularly to transistorized circuits for generating vertical deflection signals to apply to the vertical deflection windings of an electromagnetic deflection yoke for a cathode ray image reproducing tube of a television receiver.

In order to reproduce an image on the screen of a cathode ray tube in a television receiver, the electron beam of the tube is caused to scan a raster on the screen of the tube so that light is emitted therefrom in a series of vertically-spaced, horizontal lines. The electron beam is thus deflected both vertically and horizontally from its normal undeflected position. One method of providing such deflection is to use an electromagnetic deflection yoke which includes both horizontal and vertical deflection windings through which the proper currents are driven to provide the desired time varying magnetic deflecting field for the electron beam of the cathode ray tube.

Present day commercial television receivers using electron tubes employ a variety of circuits for generating vertical deflection signals to apply to the vertical deflection windings of a yoke. One such circuit uses the multivibrator principle, in which a capacitor is charged through a relatively high impedance from a source of direct voltage. The charging voltage across the capacitor is applied to an amplifier tube to generate a generally sawtooth shaped current for application to the vertical deflection windings of the yoke. A discharge or switch tube is utilized to short and discharge the charging capacitor at the proper time to retrace the beam back to its starting position and begin the cycle again. The time of initiation of the cycle is synchronized by the vertical deflection synchronizing signals transmitted to the receiver along with the image information. The deflection circuit is made self-oscillating, however, by feeding back to the switch tube a retrace voltage pulse that is developed when the current through the inductive vertical deflection windings is cut off.

The techniques of designing and constructing vertical deflection circuits with electron tubes cannot be directly applied to transistors because the transistors are essentially low impedance, current-operated devices, while the electron tube is essentially a high impedance, voltage-operated device.

In accordance with the invention, a vertical deflection circuit for supplying deflection current to the vertical deflection windings of an electromagnetic deflection yoke in a television receiver includes a drive or output transistor and a switch transistor. A charging capacitor is connected with the base electrode of the output transistor and is charged from a source of voltage which includes the base-to-emitter path of the output transistor as part of the impedance of the voltage source. The collector-to-emitter path of a switch transistor is connected across the charging capacitor to discharge it during retrace time; and feedback is provided from the collector and emitter of the output transistor to the base of the switch transistor to maintain self-oscillation in the circuit and to provide immunity against noise signals that may accompany the vertical deflection synchronizing signals which are applied to the base of the switch transistor.

The invention may be better understood when the following detailed description is read in connection with the accompanying drawings in which.

Figure 1:
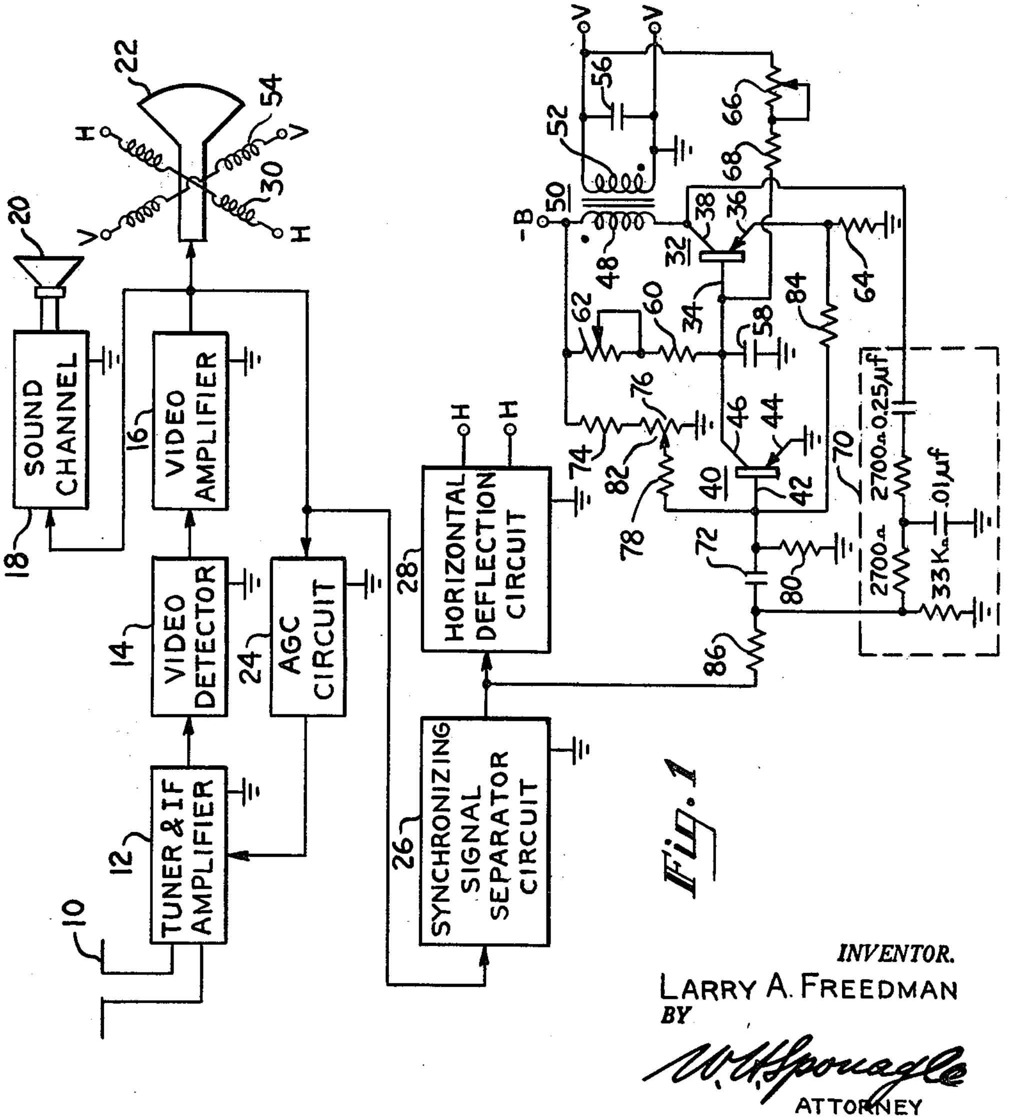
FIGURE 1 is a schematic circuit diagram, partly in block form, of a television receiver utilizing a vertical deflection circuit in accordance with the invention.

FIGURE 1 shows a television receiver which includes an antenna 10 to intercept and supply a radio frequency television wave to the tuner and IF amplifier circuits 12 of the receiver. The radio frequency wave has a picture carrier, amplitude modulated with video signals including image signals and horizontal and vertical deflection synchronizing signals; and a sound carrier, spaced 4.5 megacycles in frequency from the picture carrier according to present broadcasting standards, frequency modulated with sound signals. An amplified intermediate frequency version of the radio frequency wave is available at the output of the tuner and IF amplifier 12 and is applied to a video detector 14, where the amplitude modulation of the intermediate frequency wave is detected to provide video signals containing image signals and horizontal and vertical deflection synchronizing signals, and in which the picture and sound IF carrier waves are heterodyned to provide a 4.5 megacycle inter-carrier wave which is frequency modulated with the sound signals. The detected video signals and the intercarrier wave are applied to a video amplifier 16, from which the intercarrier wave is further applied to a sound channel 18 where it is demodulated and further applied to a loudspeaker 20 to reproduce the sound information.

The image signals are applied from the video amplifier 16 to the electron gun (not shown) of a cathode ray image reproducing tube 22 to modulate the intensity of the electron beam of the tube in accordance with the image signals. The video signal is further applied to an automatic gain control circuit 24 which generates a control voltage from the video signals to control the gain of prior amplifiers in the receiver, such as the radio frequency and intermediate frequency amplifiers in the tuner and IF amplifier 12, to maintain the amplitude changes in the detected video signals within a small range despite any large changes in the amplitude of the received radio wave.

The video signals are also applied to a synchronizing signal separator circuit 26 which separates the horizontal and vertical deflection synchronizing signals from the remainder of the video signals. The horizontal synchronizing signals are applied to a horizontal deflection circuit 28 (which may be of known design) to generate horizontal deflection signals which are available at the terminals H—H and applied to the terminals H—H of the horizontal deflection windings 30 in an electromagnetic deflection yoke (which comprises horizontal deflection windings 30 and vertical deflection windings 54 positioned on the cathode ray tube 22). The currents thus caused in the horizontal deflection windings 30 cause deflection of the electron beam of the tube in a horizontal direction.

Vertical synchronizing signals available from the synchronizing signal separator circuit 26 are applied to a vertical deflection circuit, embodying the invention, which includes an output transistor 32, having a base 34, an emitter 36, and a collector 38; and a switch transistor 40, having a base 42, an emitter 44, and a collector 46. The collector 38 of the output transistor 32 is connected to a source of operating voltage, —B, through the primary winding 48 of a vertical output transformer 50. The secondary winding 52 of the transformer 50 is connected to the vertical deflection windings 54 of the yoke through the terminals V—V. One side of the secondary winding 52 is connected to ground for the receiver, or to some other point of reference potential. The secondary winding 52 is shunted by a bypass capacitor 56 to bypass signals at the horizontal deflection frequency.

In order to supply a sawtooth driving signal, modified in a manner explained hereinafter, to the base 34 of the output transistor 32, a charging capacitor 58 is connected between the base 34 and ground, or a point of reference potential, for the receiver. The base 34 is also connected through a fixed resistor 60 and a variable resistor 62, which serves as a vertical size control, to the source of operating potential, —B. The sawtooth wave is formed by the charging of the charging capacitor 58 from the voltage supply, —B. Note, however, that the base-to-emitter path of the output transistor 32 shunts the supply voltage and, because this is a relatively low impedance path compared to the resistors 60 and 62, its impedance primarily determines the charging time constant resistance for the sawtooth capacitor 58.

The base-to-emitter impedance of a transistor is relatively low and in order to increase this impedance, an emitter resistor 64 is connected between the emitter 36 of the output transistor 32 and ground for the receiver. The effective input impedance of the output transistor 32 is thus approximately $\beta R_e$, where $\beta$ is the current gain of the transistor and $R_e$ is the value of the emitter resistor 64. However, this impedance is still small, since a typical value for the input impedance of the transistor 32 is on the order of 300 ohms, including the effect of the emitter resistor 64. This value in combination with a reasonable sized capacitor 58 (that is, one that can be discharged without excessive currents being drawn during retrace time) results in a time constant which is on the order of the period of the vertical deflection frequency, which time constant is much too short to provide the proper shaped driving voltage to the output transistor 32.

The driving voltage is properly shaped, however, by feedback from the secondary 52 of the transformer 50 to the base 34. The secondary winding 52 is poled in the opposite direction to the primary so that the feedback to the base 34 is degenerative during the first portion of the trace interval (that is, during the first portion of the charge time of the capacitor 58) and regenerative for the remainder of the trace interval.

This type of feedback, when properly proportioned, provides a current through the vertical windings 54 which is not exactly a linear rising sawtooth, but rather a linear rising sawtooth with an S-shaped component added to it. The resultant current waveform through the vertical windings 54 is shown as curve 106 in FIGURE 2, and is the type of waveform required for linear vertical deflection in wide-angle cathode ray picture tubes. A linearity control potentiometer 66 and limit resistor 68 are included in the feedback connection. Variation of the value of the linearity control 66 varies the amount of feedback and thus the shape of the driving voltage on the base of the output transistor 32.

In order to maintain self-oscillations in the circuit, the voltage appearing at the collector 38 of the output transistor 32 is fed back through a high pass filter network 70 and a storage capacitor 72 to the base electrode 42 of the switch transistor 40. A frequency or hold control is provided by connecting a limit resistor 74 and a hold potentiometer 76 in series between the sourec of operating potential, —B, and ground. A voltage divider comprising a pair of resistors 78 and 80 is serially connected between an adjustable tap 82 on the hold potentiometer 76 and ground for the receiver. The base 42 of the switch transistor 40 is connected to the junction of the voltage divider resistors 78 and 80. The collector 46 of the switch transistor 40 is connected directly to the base 34 of the output transistor 32 and the emitter 44 of the switch transistor 40 is connected directly to ground. Thus, the collector-to-emitter path of the switch transistor 40 is connected directly across the charging capacitor 58. A signal appearing across the emitter resistor 64 of the output transitor 32 is also connected through an isolating resistor 84 to the base electrode 42 of the switch transistor 40.

Figure 2:
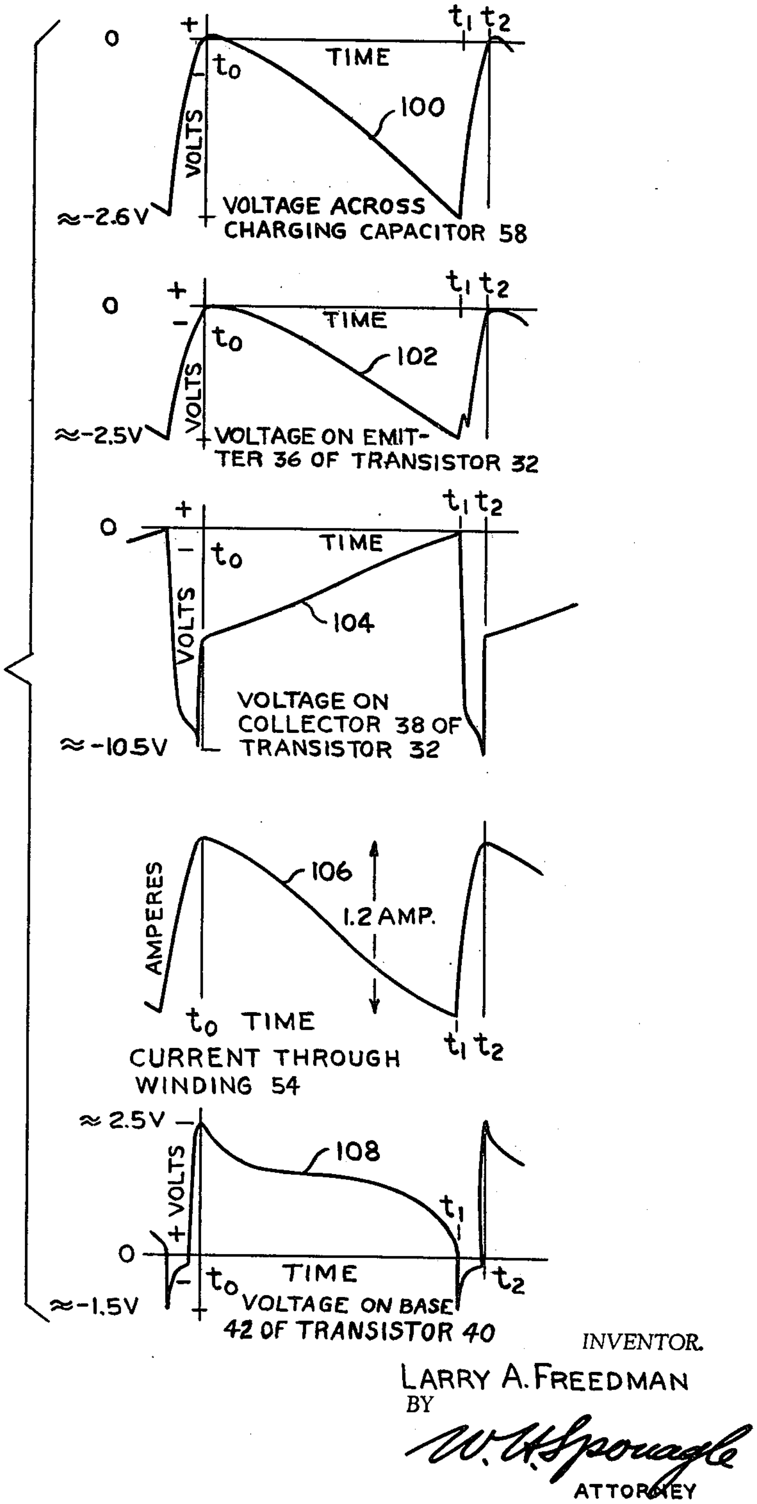
FIGURE 2 is a series of waveforms showing certain operational features of the circuit of FIGURE 1.

The operation of the circuit is best described by assuming that the charging capacitor 58 is initially discharged. The charging capacitor 58 begins to charge in a negative direction toward the value of the operating voltage, —B, as shown at $t_0$ in curve 100 of FIGURE 2. All of the waveforms in FIGURE 2 are drawn on the same time scale to illustrate the voltages and currents appearing at various points in the circuit. From $t_0$ to $t_1$ is the trace interval and from $t_1$ to $t_2$ is the retrace interval. As the voltage begins to increase in a negative direction across the charging capacitor 58, the output transistor 32 begins to conduct when the voltage across the charging capacitor 58 becomes negative, and the voltage at the emitter 36 of the output transistor 32 also begins to increase in a negative direction as shown by curve 102. The voltage at the collector 38 begins at $t_0$ to rise towards zero as shown in curve 104, and the current through the yoke winding 54 begins to decrease from its maximum current in one direction at $t_0$ to its maximum current in the opposite direction at $t_1$, as shown in curve 106. At $t_0$ the trace interval is beginning, and light is emitted from the screen of the cathode ray tube 22. The voltage at the base 42 of the switch transistor 40 is positive as shown in curve 108 and is beginning to drop towards zero.

As the end of the trace interval is reached at $t_1$ the voltage on the base 42 of the switch transistor reaches the point where the switch transistor 42 can conduct, and conduction of the switch transistor 40 abruptly discharges the charging capacitor 58, as shown in curve 100. This action abruptly reduces the current through the vertical deflection winding 54 and generates a large retrace voltage pulse thereacross. The retrace voltage pulse is coupled back through the transformer 50 and appears on the collector electrode 38 of the output transistor 32 as shown in curve 104. The retrace voltage pulse is applied back through the highpass filter 70 to the base electrode 42 of the switch transistor 40, causing heavy base current which charges the storage capacitor 72 highly positive to maintain the switch transistor 40 cut off after the cessation of the retrace pulse.

With the turning off of the switch transistor 40 the charging capacitor 58 again begins to charge to repeat the cycle. The frequency of operation of the circuit as a free running oscillator is determined by the time it takes the storage capacitor 72 to discharge again to a point where the switch transistor 40 can again conduct. Note that the storage capacitor 72 discharges through the resistors 80, 78 and the hold control potentiometer 76. Variation of the tap 82 on the hold control potentiometer 76 thus varies the discharge time of the storage capacitor 72 and varies the frequency of operation of the circuit. The shape of the voltage on the base 42 between $t_0$ and $t_1$ is derived from the combination of the discharge of the storage capacitor 72, an S-shaped wave derived through the high pass filter 70 from the collector 38 of the output transistor 32, and from the nearly sawtooth wave (curve 102, FIGURE 2) on the emitter electrode 36 of the output transistor 32. The high pass filter 70 eliminates the sawtooth portion of the collector voltage shown during the trace time in curve 104 and passes only the high frequency S-shaped portion. The combination of these two voltages provides a voltage having the waveform shown as curve 108 which aids in holding the base 42 of the switch transistor 40 quite positive until near the end of trace interval.

Vertical synchronizing signals from the synchronizing signal separator circuit 26 are applied through the isolating resistor 86 and the storage capacitor 72 to the base electrode 42 of the switch transistor 40. A negative going vertical signal is used and it abruptly drives the base 42 negative to cause the switch transistor 40 to conduct and initiate the discharge of the charging capacitor 58. This action synchronizes the operation of the circuit with the vertical synchronizing signals contained in the received television signal.

Note that the voltage on the base 42 of the switch transistor 40 as shown in curve 108, FIGURE 2 is maintained highly positive during the trace interval, maintaining the transistor 40 well below cutoff for the major portion of the trace time. This provides a high degree of noise immunity for the circuit, because low amplitude noise signals, which might appear with the vertical synchronizing signals, are unable to turn the switch transistor 40 on and cause incorrect operation.

The typical values for a vertical deflection circuit constructed in accordance with the invention for use with a cathode ray tube having a 110° deflection angle and operating with 18,000 volts and using a yoke having vertical deflection windings with 6 ohms resistance and 18 millihenries inductance are as follows:

| | | |
|---|---|---|
| Resistor 60 | ohms | 2700 |
| Resistor 62 | ohms variable | 2500 |
| Resistor 66 | do | 250 |
| Resistor 68 | do | 270 |
| Resistor 64 | ohms | 4.7 |
| Resistor 74 | do | 33,000 |
| Potentiometer 76 | do | 50,000 |
| Resistor 78 | do | 33,000 |
| Resistor 80 | do | 6800 |
| Charging capacitor 58 | microfarads | 50 |
| Storage capacitor 72 | do | 1 |

The values of resistors and capacitors in the filter network are shown in the drawing. The output transistor 32 is a commercially available RCA type 2N301A and the switch transistor 40 is a commercially available RCA type 2N404. The circuit provided a yoke current in the vertical deflection windings 54 of 1.2 amperes peak-to-peak to provide full deflection of the beam of the cathode ray tube. The frequency shift of the circuit, as a free running oscillator, for an operating voltage change of 24 to 34 volts was less than ±0.5 cycle per second. A frequency increase of between 1.7 and 3 cycles per second was noted when the temperature of the entire circuit was raised from 25° C. to 62° C.

Figure 3:
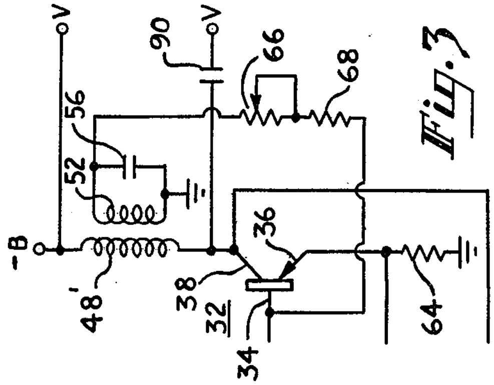
FIGURES 3 and 4 are schematic circuit diagrams illustrating other embodiments of the invention.

FIGURE 3 shows a partial schematic diagram of the output stage connected with the output transistor 32 to illustrate that capacitive coupling may be used between the circuit and the vertical deflection windings 54 instead of transformer coupling. A choke coil 48′ is connected between the collector 38 of the output transistor 32 and the source of operating voltage, —B. A coupling capacitor 90 is connected between the collector 38 and one side of the vertical deflection windings 54 and the other side of the windings is connected directly to the source of operating voltage, —B. In order to provide the feedback to the base 34, an auxiliary winding 52′ is magnetically coupled to the choke coil 48′ and bypassed at horizontal frequencies by a bypass capacitor 56. One end of the auxiliary winding 52′ is connected directly to ground and the other end is connected through the linearity control 66 and the limit resistor 68 to the base 34 of the output transistor 32. The remainder of the circuit is identical to that shown in FIGURE 1 and operates in the same manner, with the exception that the current from the collector 38 of the output transistor 32 for driving the vertical windings is coupled through the capacitor 90 instead of a transformer as shown in FIGURE 1.

Figure 4:
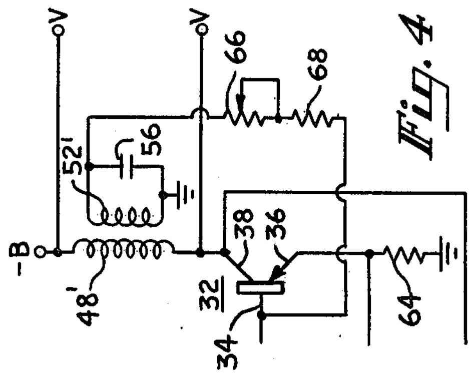

Direct coupling of the vertical deflection windings 54 to the output transistor 32 may be used as shown in the partial schematic diagram of FIGURE 4 which is identical to the circuit diagram of FIGURE 3 with the exception that the coupling capacitor 90 shown in FIGURE 3 has been eliminated. The operation of the FIGURE 4 circuit is identical to that shown in FIGURE 3. It will be appreciated, however, that a certain amount of direct current will flow through the vertical windings 54 resulting in a slight decentering of the raster on the screen of the cathode ray tube 22. This decentering may be corrected, as is known, by the use of permanent magnet centering devices.

What is claimed is:

1. In a television receiver having a cathode ray image reproducing tube, vertical deflection windings for said tube, and a source of vertical synchronizing signals, a vertical deflection circuit comprising in combination:

a first transistor having a base, a collector, and an emitter;

a charging capacitor connected to the base of said first transistor;

a charging circuit for said capacitor including a source of direct voltage connected to said capacitor;

a discharge circuit for said capacitor including a second transistor having a base, a collector, and an emitter, and having the collector-to-emitter path of said second transistor connected across said capacitor;

first feedback means connected between the collector of said first transistor and the base of said second transistor for providing self-oscillations in said circuit sequentially to charge said capacitor during a charging cycle through said charging circuit, and to discharge said capacitor during a discharge cycle through the collector-to-emitter path of said second transistor;

coupling means for connecting the vertical deflection windings to the collector of said first transistor for supplying deflection current thereto;

second feedback means coupled between said collector of said first transistor and the base of said first transistor such that the feedback signal applied to said first transistor is degenerative during the first part of the charging cycle of said charging capacitor and regenerative during the second part of the charging cycle of said charging capacitor;

third feedback means connected between the emitter of said first transistor and the base of said second transistor for applying during said charge cycle a voltage to the base of said second transistor which near the end of said charge cycle is abruptly changing in a direction tending to turn on said second transistor; and means for applying said vertical synchronizing signals to said second transistor to initiate the discharge cycle of said capacitor and synchronize the frequency of said self-oscillations to said vertical synchronizing signals.

2. In a television receiver having a cathode ray image reproducing tube, vertical deflection windings for said tube, and a source of vertical synchronizing signals, a vertical deflection circuit comprising in combination:

a first transistor having a base, a collector, and an emitter;

a charging capacitor connected to the base of said first transistor;

a charging circuit for said capacitor including a source of direct voltage connected to said capacitor;

a discharge circuit for said capacitor including a second transistor having a base, a collector, and an emitter, and having the collector-to-emitter path of said second transistor connected across said capacitor;

first feedback means including a storage capacitor connected between the collector of said first transistor and the base of said second transistor for providing self-oscillations in said circuit sequentially to charge said charging capacitor during a charging cycle through said charging circuit, and to discharge said charging capacitor during a discharge cycle through the collector-to-emitter path of said second transistor and to charge said storage capacitor in a polarity to maintain said second transistor non-conductive during the succeeding charge cycle;

coupling means for connecting the vertical deflection windings to the collector of said first transistor for supplying deflection current thereto;

second feedback means coupled between said collector of said first transistor and the base of said first transistor for applying a feedback signal to said first transistor that is degenerative during the first part of the charging cycle of said charging capacitor and regenerative during the second part of the charging cycle of said charging capacitor such that the rate of change of deflection current is less than that of a linear sawtooth current near the beginning and near the end of the charge cycle and greater than that of a linear sawtooth current during the remaining intermediate portion of the charge cycle;

third feedback means connected between the emitter of said first transistor and the base of said second transistor for applying during said charge cycle a voltage to the base of said second transistor which near the end of said charge cycle is abruptly changing in a direction tending to turn on said second transistor; and means for applying said vertical synchronizing signals to said second transistor to initiate the discharge cycle of said capacitor and synchronize the frequency of said self-oscillations to said vertical synchronizing signals.

3. In a television receiver having a cathode ray image reproducing tube and vertical deflection windings for said tube, a vertical deflection circuit comprising in combination:

a first transistor having a base, a collector, and an emitter;

a charging capacitor connected to the base of said first transistor;

a charging circuit for said capacitor including a source of direct voltage connected to said capacitor;

a discharge circuit for said capacitor including a second transistor having a base, a collector, and an emitter, and having the collector-to-emitter path of said second transistor connected across said capacitor;

first feedback means including a high pass filter network and a storage capacitor connected between the collector of said first transistor and the base of said second transistor for providing self-oscillations in said circuit sequentially to charge said capacitor during a charging cycle through said charging circuit and generate a deflection current in the collector-to-emitter path of said first transistor, and to discharge said charging capacitor during a discharge cycle through the collector-to-emitter path of said second transistor;

said first feedback means applying, during the charge cycle, the high frequency component of the voltage appearing on the collector of said first transistor to the base of said second transistor which tends to maintain the second transistor cutoff during the charge cycle, but which at the end of the charge cycle is changing in a direction tending to turn on said second transistor, said first feedback means applying during the discharge cycle a retrace pulse, generated across said vertical deflection winding, to the base of said second transistor to rapidly discharge said charging capacitor and to charge said storage capacitor in a polarity to cutoff said second transistor;

second feedback means connected between the emitter of said first transistor and the base of said second transistor for applying during said charge cycle a voltage to the base of said second transistor which near the end of said charge cycle is abruptly changing in a direction tending to turn on said second transistor;

third feedback means coupled between said collector of said first transistor and the base of said first transistor such that the feedback signal applied to said first transistor is degenerative during the first part of the charging cycle of said charging capacitor and regenerative during the second part of the charging cycle of said charging capacitor; and coupling means for connecting the vertical deflection windings between the collector and emitter of said second transistor for supplying said deflection current thereto.

4. In a television receiver having a cathode ray image reproducing tube, vertical deflection windings for said tube, and a source of vertical synchronizing signals a vertical deflection circuit comprising in combination:

a first transistor having a base, a collector, and an emitter;

a charging capacitor connected to the base of said first transistor;

a charging circuit for said capacitor including a source of direct voltage connected to said capacitor;

a discharge circuit for said capacitor including a second transistor having a base, a collector, and an emitter, and having the collector-to-emitter path of said second transistor connected across said capacitor;

first feedback means including a high pass filter network and a storage capacitor connected between the collector of said first transistor and the base of said second transistor for providing self-oscillations in said circuit sequentially to charge said capacitor during a charging cycle through said charging circuit and generate a deflection current in the collector-to-emitter path of said first transistor, and to discharge said charging capacitor during a discharge cycle through the collector-to-emitter path of said second transistor;

said first feedback means applying, during the charge cycle, the high frequency component of the voltage appearing on the collector of said first transistor to the base of said second transistor which tends to maintain the second transistor cutoff during the charge cycle, but which at the end of the charge cycle is changing in a direction tending to turn on said second transistor, said first feedback means applying during the discharge cycle a retrace pulse, generated across said vertical winding, to the base of said second transistor to rapidly discharge said charging capacitor and to charge said storage capacitor in a polarity to cutoff said second transistor;

second feedback means connected between the emitter of said first transistor and the base of said second transistor for applying during said charge cycle a voltage to the base of said second transistor which near the end of said charge cycle is abruptly changing in a direction tending to turn on said second transistor;

third feedback means coupled between said collector of said first transistor and the base of said first transistor such that the feedback signal applied to said first transistor is degenerative during the first part of the charging cycle of said charging capacitor and regenerative during the second part of the charging cycle of said charging capacitor;

coupling means for connecting the vertical deflection windings between the collector and emitter of said second transistor for supplying said deflection current thereto; and means for applying the vertical synchronizing signals to the base of said second transistor to synchronize the frequency of said self-oscillations to the frequency of said vertical synchronizing signals.

References Cited in the file of this patent

UNITED STATES PATENTS

| | | |
|---|---|---|
| 2,729,766 | Vilkomersom | Jan. 3, 1956 |
| 2,954,504 | Saudinaitus et al. | Sept. 27, 1960 |
| 3,054,020 | Cope | Sept. 11, 1962 |